(12) United States Patent
Miglani et al.

(10) Patent No.: US 8,712,239 B1
(45) Date of Patent: Apr. 29, 2014

(54) MIRROR DRIFT COMPENSATION IN AN OPTICAL CIRCUIT SWITCH

(71) Applicant: CALIENT Technologies, Inc., Goleta, CA (US)

(72) Inventors: Jitender Miglani, Hollis, NH (US); Mike Deacon, Ventura, CA (US); Vijayan Thattai, Goleta, CA (US); Sushma Sagaram, Camarillo, CA (US)

(73) Assignee: Calient Technologies, Inc., Goleta, CA (US)

( * ) Notice: Subject to any disclaimer, the term of this patent is extended or adjusted under 35 U.S.C. 154(b) by 0 days.

(21) Appl. No.: 14/040,437

(22) Filed: Sep. 27, 2013

Related U.S. Application Data (63) Continuation of application No. 13/958,889, filed on Aug. 5, 2013.

(51) Int. Cl.
*H04J 14/00* (2006.01)
*G02B 6/26* (2006.01)

(52) U.S. Cl.
USPC .......... 398/45; 398/48; 398/49; 398/50; 385/16; 385/18; 359/212.1; 359/221.1

(58) Field of Classification Search
USPC ............ 398/45–51; 385/16–18; 359/221.2
See application file for complete search history.

(56) References Cited

U.S. PATENT DOCUMENTS

| | | | |
|---|---|---|---|
| 5,037,173 A | 8/1991 | Sampsell et al. | |
| 6,097,860 A | 8/2000 | Laor | |
| 6,411,751 B1 * | 6/2002 | Giles et al. | 385/16 |
| 6,456,751 B1 | 9/2002 | Bowers et al. | |
| 6,556,739 B1 | 4/2003 | Kruglick et al. | |
| 6,567,574 B1 | 5/2003 | Ma et al. | |
| 6,571,029 B1 * | 5/2003 | Kruglick et al. | 385/16 |
| 6,628,041 B2 | 9/2003 | Lee et al. | |
| 6,690,885 B1 | 2/2004 | Aksyuk et al. | |
| 6,798,992 B1 | 9/2004 | Bishop et al. | |
| 6,819,815 B1 | 11/2004 | Corbalis et al. | |
| 6,823,101 B2 | 11/2004 | Gates, II et al. | |
| 6,836,381 B2 | 12/2004 | Giles et al. | |
| 6,922,500 B2 * | 7/2005 | Huang et al. | 385/18 |
| 7,239,773 B2 * | 7/2007 | Sakai et al. | 385/18 |
| 7,676,125 B2 | 3/2010 | Zheng et al. | |
| 8,125,701 B2 * | 2/2012 | Yamaguchi et al. | 359/221.2 |
| 2005/0286891 A1 * | 12/2005 | Sakai et al. | 398/45 |
| 2010/0020378 A1 * | 1/2010 | Yamaguchi et al. | 359/221.2 |

* cited by examiner

*Primary Examiner* — Li Liu
(74) *Attorney, Agent, or Firm* — SoCal IP Law Group LLP; Steven C. Sereboff; John E. Gunther (57) ABSTRACT

Methods of operating an optical circuit switch and optical circuit switches are disclosed. An optical circuit switch may receive a first make command to make a first optical connection between a first port and a second port, the first port uniquely associated with a rotatable mirror element, determine a first baseline voltage to be applied to an electrode coupled to the mirror element to cause the mirror element to rotate about an axis to make the first optical connection, and apply the first baseline voltage to the electrode. The optical circuit switch may periodically adjust the voltage applied to the electrode to minimize an insertion loss of the first optical connection, and periodically store accumulated angular drift data in a memory, the accumulated angular drift data derived from a difference between the adjusted voltage applied to the first electrode and the first baseline voltage.

18 Claims, 9 Drawing Sheets

MIRROR DRIFT COMPENSATION IN AN OPTICAL CIRCUIT SWITCH

RELATED APPLICATION INFORMATION

This patent is a continuation of application Ser. No. 13/958,889, filed Aug. 5, 2013, titled MIRROR DRIFT COMPENSATION IN AN OPTICAL CIRCUIT SWITCH.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
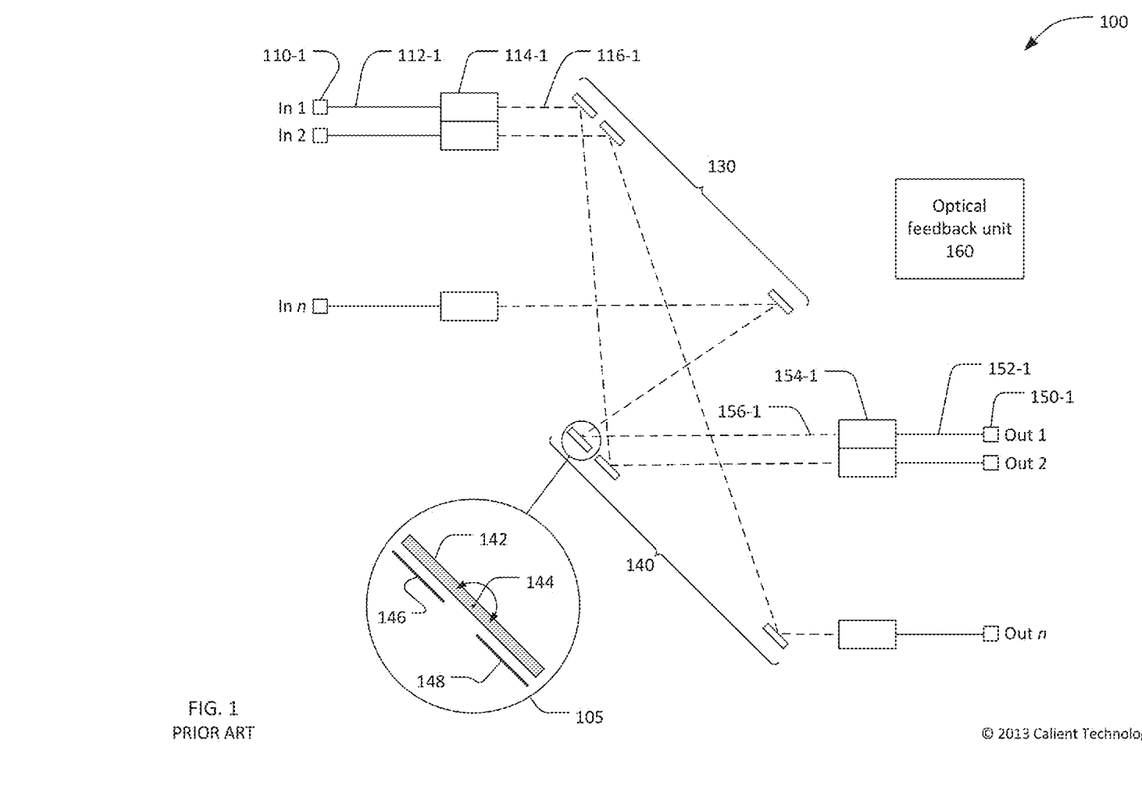
FIG. 1 is an optical schematic diagram of an optical circuit switch.

Referring now to FIG. 1, an exemplary optical circuit switch 100 may be configured to connect a group of n input ports (where n is an integer greater than 1), labeled In 1 to In n, to a group of n output ports, labeled Out 1 to Out n. More specifically, the optical circuit switch 100 may selectively connect up to n pairs of ports, where each pair of ports includes an input port and an output port.

Each of the input ports In 1 to In n may be a connector (of which only the connector 110-1 is identified) to receive an input optical signal from a optical fiber cable (not shown) external to the optical circuit switch. Each connector may be coupled by a respective optical fiber (of which only optical fiber 112-1 is identified) to a respective collimator lenses (of which only collimator lens 114-1 is identified). Each collimator lens may convert the input optical signal from the respective optical fiber into a collimated input optical beam (of which only input optical beam 116-1 is identified) in free space. Free space optical beams are shown in FIG. 1 as dashed lines.

Each input optical beam, such as input optical beam 116-1 may be directed onto a first mirror array 130. The first mirror array may include n mirrors with a one-to-one correspondence between input optical beams and mirrors, such that each input optical beam is directed onto a respective mirror. To improve the manufacturing yield of the first mirror array, the first mirror array 130 may include more than n mirrors, in which case the n input optical beams may be directed to a subset of n mirrors that are known to be fully functional. Since each of the n input optical beams originates from a specific port and is directed onto a specific mirror, each port may be described as "uniquely associated" with a corresponding mirror. In this patent, "uniquely associated" means a one-to-one correspondence. To take advantage of the available fully functional mirrors, the associations between ports and mirrors may be different in different optical circuit switches Each mirror on the first mirror array 130 may reflect the respective input optical beam to a selected mirror of a second mirror array 140. The mirrors of the second mirror array may reflect the incident beam to form a respective output optical beam (of which only output optical beam 156-1 is identified). Each output optical beam may be directed to a corresponding focusing lens (of which only focusing lens 154-1 is identified). Each focusing lens may focus the respective output optical beam into an output optical signal in a respective optical fiber (of which only output optical fiber 152-1 is identified). The output optical signal may be conveyed to a respective output port connector (of which only connector 150-1 is identified).

The optical circuit switch 100 may create a one-to-one connection between each input port and any one of the output port. For example, as shown in FIG. 1, Port In 1 is connected to port Out 2, port In 2 is connected to port Out n, and port In n is connected to port Out 1.

The detail view 105 shows a simplified schematic diagram of a mirror from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148. For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode may be "dedicated" to the mirror element 142, which is to say the only function of the electrodes 146 and 148 is to rotate the mirror element 142 and the voltages applied to the electrodes 146 and 148 have no effect on any mirror element other then the mirror element 142.

In the simplified example of FIG. 1, the mirror element 142 rotates about a single axis defined by the torsion bars 144. Either or both of the first mirror array 130 and the second mirror array may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 105. For example, U.S. Pat. No. 6,628,041 describes a MEMS mirror array having two-axis mirror motion and comb actuators.

The optical circuit switch 100 may include an optical feedback unit 160. As will be discussed subsequently, the optical feedback unit 160 may provide data indicative of the position of some or all of the mirror elements to a switch controller (not shown). The switch controller may use the data from the optical feedback unit 160 to control some or all of the mirror elements to minimize the insertion loss of each connection through the optical circuit switch. The optical feedback unit 160 may, for example, determine the position of each mirror element indirectly by measuring the positions of probe beams reflected from the mirrors, as described in U.S. Pat. No. 6,819,815.

The optical feedback unit 160 may directly measure the insertion loss of each optical connection made by the optical circuit switch 100. For example, fiber optic tap couplers (not shown) may be used to route a sample portion of each output optical signal and, optionally, each input optical signal to the optical feedback unit. Sample portions may be extracted from the input optical beams, such as input optical beam 120-1, and/or the output optical beams, such as output optical beam 160-1, using one or more free space sampling optical elements. For example, sample portions may be extracted as described in U.S. Pat. No. 6,597,825 or U.S. Pat. No. 6,668,108. As described in U.S. Pat. No. 7,676,125, the optical feedback unit 160 may use a small number of optical power meters and a scanning optical system to periodically measure the power level of each sample portion to determine the insertion loss of each connection. In this case, the optical feedback unit 160 may not continuously determine the insertion loss of each optical circuit, but instead may provide regular samples of the insertion loss of each circuit. The optical feedback unit 160 may provide feedback to the switch control unit in some other manner.

Figure 2:
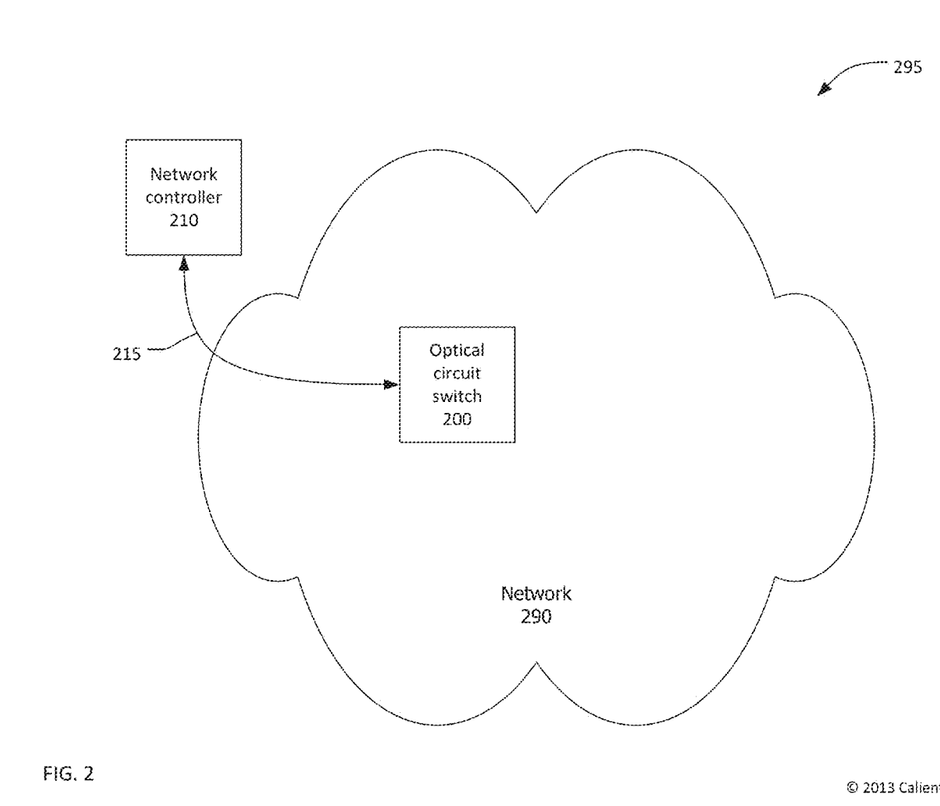
FIG. 2 is a block diagram of an environment for an optical circuit switch.

Referring now to FIG. 2, an environment 295 for the application of an optical circuit switch 200 may include a network 290 and a network controller 210. The optical circuit switch 200, which may be the optical circuit switch 100, may be disposed within the network 290 and may function to switch optical connections between other nodes (not shown) within the network 290. The network 290 may be, for example, a wide area network, a local area network, a storage area network, a private network within a data center or computer cluster, and may be or include the Internet. While the connections switched by the optical circuit switch 200 are optical, other connections within the network 290 may be wired and/or wireless.

The network controller 210 may be a computing device that provides a graphic user interface or a command line interface for a network operator to enter connection commands (i.e. commands to make or break one or more optical connections) for the optical circuit switch 200. The network controller 210 may be a computing device running network management software, in which case connection commands for the optical circuit switch 200 may be generated automatically by the network controller 210.

A communications link 215 between the optical circuit switch and the network controller 210 may be in-band, which is to say the communications link 215 may be a path within the network 290. In this case, the optical circuit switch may have a wired, wireless, or optical connection to the network in addition to the optical connections being switched. The communications link 215 may be out-of-band, which is to say the communications link 215 may be a dedicated connection or a connection via a command network independent from the network 290. A configuration in which the network controller 210 executes network management software to automatically provide connections commands to the optical circuit switch 200 via an out-of-band communications link 215 is an example of what is commonly called a "software defined network".

Figure 3:
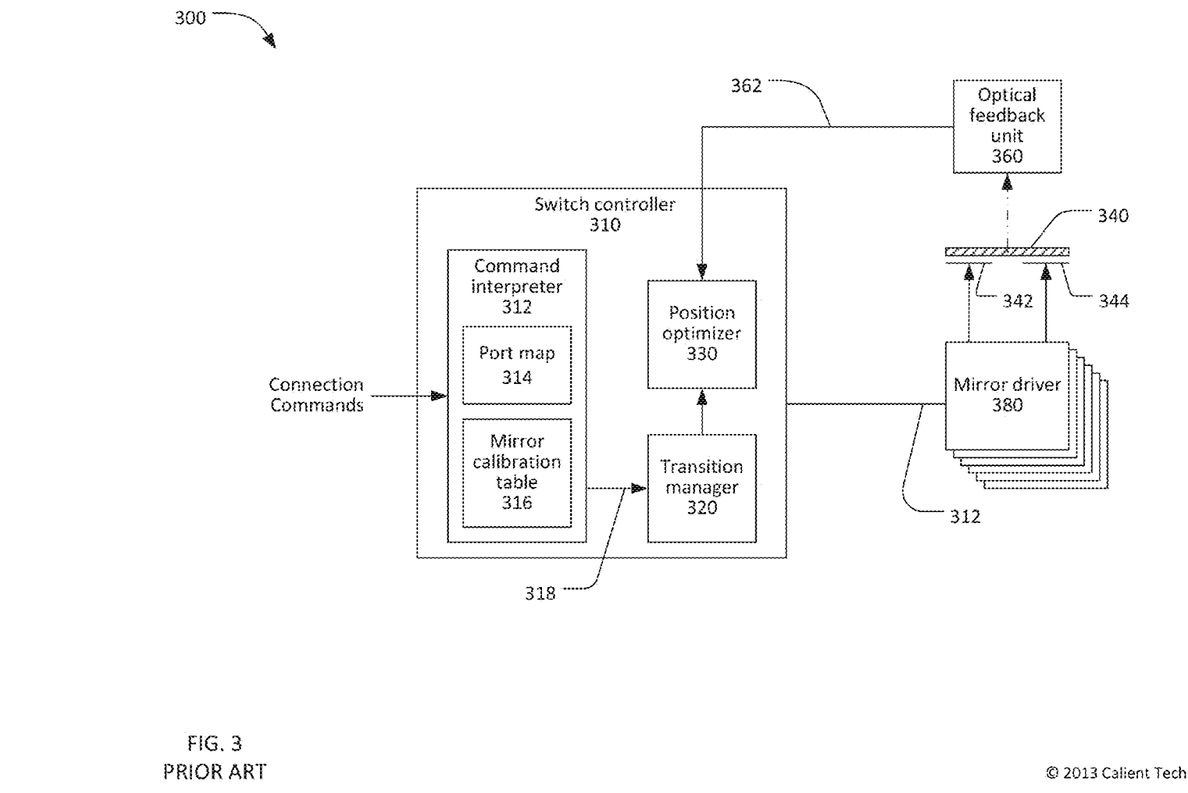
FIG. 3 is a block diagram of an optical circuit switch.

FIG. 3 is a block diagram of an optical circuit switch 300, which may be the optical circuit switch 100. The optical circuit switch 300 may include a switch controller 310, an optical feedback unit 360, a plurality of mirror elements (of which only mirror element 340 is shown) in one or more mirror arrays and a plurality of mirror driver circuits 380. The optical circuit switch 300 may include one mirror driver circuit 380 for each mirror element if the individual mirror elements are rotatable about a single axis. The optical circuit switch 300 may include two mirror driver circuits 380 for each mirror element in the mirror arrays if the individual mirror elements are rotatable about two orthogonal axes. Each mirror driver circuit 380 may have, for example, two selectable outputs to drive one or the other of a pair of electrodes, as described in pending patent application Ser. No. 13/787,621.

The controller 310 may include a command interpreter 312, a transition manager 320, and a position optimizer 330. The controller 310 may receive connection commands from an external source such as the network controller 210. The controller 310 may receive connection commands from some other source or in some other manner.

The command interpreter 312 may be responsive to a set of connection commands received by the controller 310. The set of connection commands may include, for example "Break a-b" and "Make a-b". These commands may respectively instruct the optical circuit switch 300 to either break an existing connection between ports a and b (where a is an integer input port number and b is an integer output port number), or to make a new connection between ports a and b. The set of connection commands may include a mass connection command, which may list multiple connections to be made. The mass connection command may be used, for example, when the optical circuit switch is initially integrated into a network or when substantial reconfiguration of the network or data center is required.

The command interpreter 312 may include or have access to a port map 314. As previously described, to allow the use of mirror arrays with a small number of nonoperational mirror elements, the number of mirror elements in each mirror array may be larger than the number of input or output ports. Each input and output port may be coupled to a known, operational mirror element in the respective mirror array. The port map 314 may be a table containing data relating each input port to a mirror element in a first mirror array, and data relating each output port to a mirror element in a second mirror array. The data in the port map 314 may be specific to the particular first and second mirror arrays used in the optical circuit switch 300.

There may be some performance variation from mirror element to mirror element and/or from mirror array to mirror array. In particular, there may be some variation in the mirror element rotation angle versus applied voltage characteristics within and between mirror arrays. The command interpreter 312 may include or have access to a mirror calibration table 316 which contains data describing the performance of each mirror element. For example, the mirror calibration table 316 may store the rotation angle versus voltage characteristic of each mirror element under nominal conditions. The mirror calibration table 316 may store, for all possible pairs of input and output mirror elements, a set of baseline voltages that, when applied to the appropriate electrodes, should cause the mirror elements to rotate to make the desired connection. The data in the mirror calibration table 316 may be specific to the particular mirror arrays used in the optical circuit switch 300. The data in the mirror calibration table 316 may be derived, for example, from the results of tests performed on the particular mirror arrays used in the optical circuit switch 300. Based on the data stored in the mirror calibration table 316, the command interpreter 312 may determine baseline voltage values 318 required to make desired connections through the optical circuit switch As previously described, each mirror element may be a silicon slab supported by one or two sets of silicon torsion bars. A mirror element and the supporting torsion bars are a highly under-damped mechanical system. Applying an abrupt voltage change to an electrode associated with a mirror element may result in substantial overshoot of the mirror rotation angle that may result in mechanical damage to the mirror element. This overshoot may be followed by prolonged rotational oscillations that extend the time required to make a connection through the optical circuit switch.

To minimize the time required to make a connection, the transition manager 320 may receive the baseline voltage values 318. Each time a connection is broken or a new connection is made, the transition manager 320 may manage a gradual change, or transition, in the voltages applied to the electrodes of the affected mirror elements. The transition manager 320 may cause the voltages applied to the electrodes to change linearly or nonlinearly in time such that overshoot and oscillation of the mirror element rotation angles is suppressed or minimized.

After the transition manager 320 changes the voltages applied to the electrodes associated with the affected mirror element, control of the mirror elements may be transferred to the position optimizer 330. The position optimizer 330 may receive data 362 indicative of the positions of the mirror elements from the optical feedback unit 360. For example, the optical feedback unit 360 may provide data indicating the optical signal power levels at the input ports and the output ports, respectively. The position optimizer 330 may determine the insertion loss of each active optical connection (i.e. each optical connection where light is present) from the respective input and output power levels. The position optimizer 330 may periodically adjust the positions of some or all of the mirror elements to minimize the insertion loss of each optical connection. For example, to optimize a connection, the position optimizer 330 may make incremental changes in the position of one of the mirror elements used in the connection and observe the resulting effect on insertion loss. The optimum position of the mirror element may then be found using a hill climbing algorithm or a similar algorithm. The position of each mirror element may be optimized periodically.

After voltages are applied to electrodes associated with a pair of input and output mirror elements to initially make a connection, the rotation angles of the mirror elements may drift over time even though the voltages applied to the electrodes are held constant. A number of factors may contribute to mirror element drift. The mirror arrays used in the optical circuit switch 300 may be fabricated by chemical micromachining of a silicon substrate. Each mirror element may consist of a reflective coating on a silicon slab that is connected to the silicon substrate by narrow silicon torsion bars. Each silicon mirror slab may be free to rotate about the axis or axes defined by the torsion bars. Mirror element drift may be due to mechanical stress relief of the torsion bars over time. Further, all or portions of the silicon surfaces of the mirror array may be coated with $SiO_2$ or some other dielectric. Electric charge may be trapped at defects in the dielectric layers and contribute to mirror element drift over time. Other causes may also contribute to mirror element drift.

By periodically optimizing the position of each mirror element, the position optimizer 330 may compensate for mirror element drift in established connections through the optical circuit switch. The time interval between successive optimizations of each mirror element may be short (on the order of seconds or minutes) compared to the time constant of the mirror element drift (on the order of hours). However, the position optimizer can only compensate for drift of mirror elements used in active connections through the optical circuit switch. The trapped charge, mechanical stress, and other factors contributing to mirror element drift may persist after a connection is broken. Trapped charge, mechanical stress, and other factors that persist after a connection is closed or changed will be collectively referred to as "residual drift". Residual drift may slowly decay for mirrors that remain unused. Unless compensated, residual drift may interfere with making a new connection using a mirror element that drifted substantially while being used in a previous connection.

Figure 4:
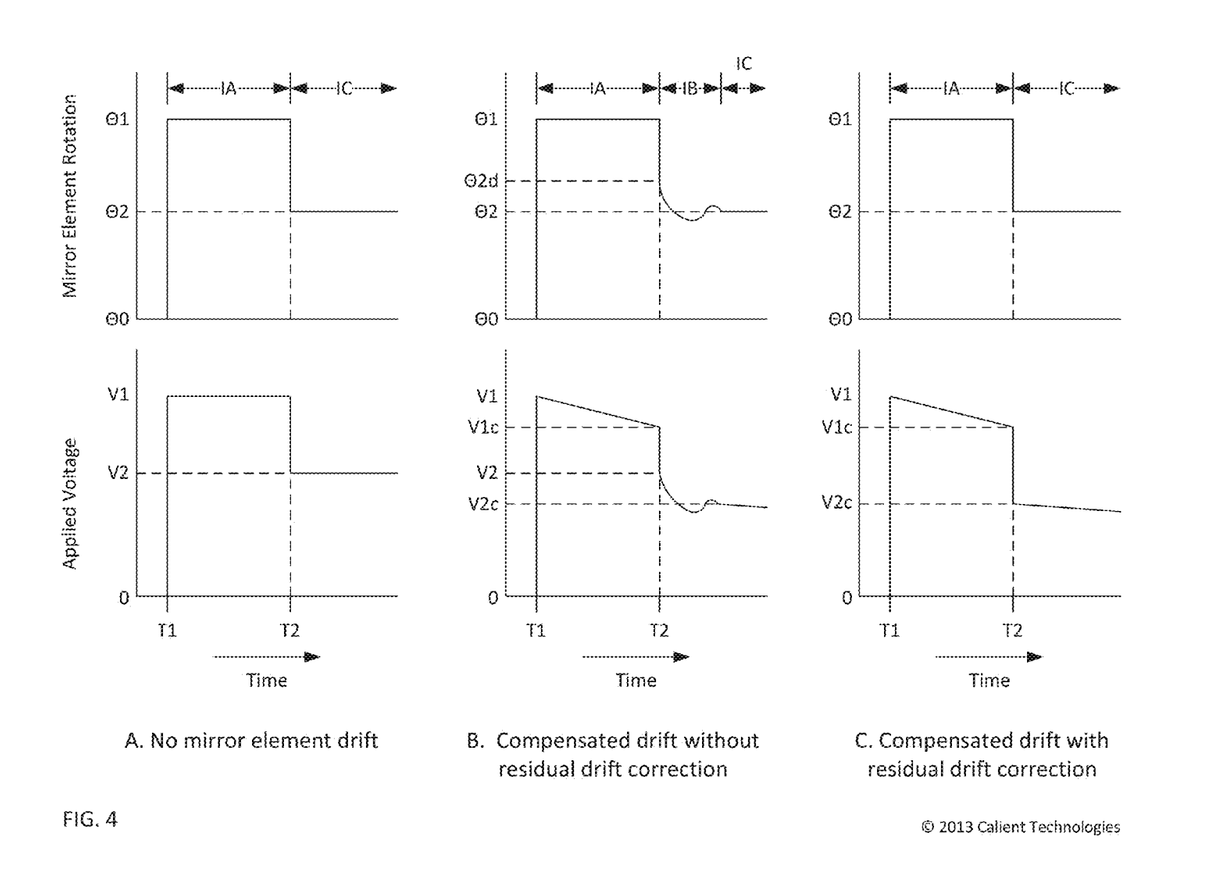
FIG. 4 shows graphs illustrating the operation of a hypothetical mirror element under three sets of assumptions.

FIG. 4 illustrates the performance of a hypothetical mirror element in an optical circuit switch under three sets of assumptions. In each case, the lower chart plots the voltage applied to a mirror electrode versus time, and the upper chart plots the resulting mirror rotation angle on the same time scale. The left pair of charts (A) shows the mirror element performance under the assumption that mirror element drift does not occur. At time T1, a command may be received to make a connection that requires the mirror element to rotate to a first angle $\Theta 1$. After consulting the mirror calibration table 316, a first baseline voltage V1 is applied to the electrode to cause the mirror to rotate to the desired angle $\Theta 1$. Since there is assumed to be no mirror element drift, both the voltage V1 and the angle $\Theta 1$ are stable during the following time interval IA. At time T2, a command is received to make a different connection requiring the mirror element to rotate to a second angle $\Theta 2$. After again consulting the mirror calibration table 316, a second baseline voltage V2 is applied to the electrode, causing the mirror element to rotate to the desired angle $\Theta 2$. The applied voltage and the mirror element rotation angle are both stable during the following time interval IC.

The center pair of charts (B) shows the mirror element performance under the assumptions that (1) mirror element drift occurs and is compensated by the position optimizer 354, and (2) residual drift is not considered when making a new connection. At time T1, a command may be received to make the connection that requires the mirror element to rotate to a first angle $\Theta 1$. After consulting the mirror calibration table 316, the first baseline voltage V1 is applied to the electrode to cause the mirror to rotate to the desired angle $\Theta 1$. Mirror element drift occurs, but is compensated as the position optimizer 330 gradually reduces the applied voltage to a value V1c (V1compensated) to keep the mirror element rotation angle fixed over the time period IA. Reducing the voltage to compensate for the mirror element drift is exemplary. In other circumstances, drift compensation may require increasing the applied voltage. At time T2, a command is received to make a different connection requiring the mirror element to rotate to the second angle $\Theta 2$. After again consulting the mirror calibration table 316, the second baseline voltage V2 is applied to the electrode. However, the trapped charge, mechanical stress, and other factors that caused the drift over the time period IA persist. The residual drift results in the mirror element rotating to an angle $\Theta 2d$ ($\Theta 2$ drifted), which is different from the desired angle $\Theta 2$. The difference between the actual rotation angle $\Theta 2d$ and the desired rotation angle $\Theta 2$ may be sufficient to degrade or break the intended connection. During time interval IB, the position optimizer may undertake a search to determine a compensated voltage V2c to cause the mirror element to rotate to the desired angle $\Theta 2$. During this search, the applied voltage and the mirror rotation angle may vary and the connection may be unreliable or intermittent.

The right pair of charts (C) shows the mirror element performance under the assumptions that (1) mirror element drift occurs and is compensated by the position optimizer 354 and (2) any change in the voltage applied to the mirror element is corrected using an estimate of residual drift. At time T1, a command may be received to make the connection that requires the mirror element to rotate to a first angle $\Theta 1$. After consulting the mirror calibration table 316, the first baseline voltage V1 is applied to the electrode to cause the mirror to rotate to the desired angle $\Theta 1$. Mirror element drift occurs, but is compensated as the position optimizer 330 gradually reduces the applied voltage to the value V1c (V1compensated) to keep the mirror element rotation angle fixed over the time period IA. The amount of drift is indicated by the difference between the first voltage V1 and the compensated voltage V1c. At time T2, a command is received to make a different connection requiring the mirror element to rotate to the second angle $\Theta 2$. The mirror calibration table 316 may be consulted to determine the second baseline voltage V2 that, in the absence of residual drift, would cause the mirror to rotate to the desired angle $\Theta 2$. Recognizing that residual drift accumulated over the time interval IA will affect the rotation angle of the mirror element, a corrected voltage V2c may be estimated. The corrected voltage V2c may be estimated by applying a correction factor to the baseline voltage. The correction factor may be derived from the difference between the first voltage V1 and the compensated voltage V1c. The corrected voltage V2c may be applied to the electrode at time T2, causing the mirror to rotate to an angle very close to the desired angle $\Theta 2$. As described above, reducing the voltage to compensate for the mirror element drift is exemplary. In other circumstances, drift compensation may require slowly increasing the applied voltage.

Figure 5:
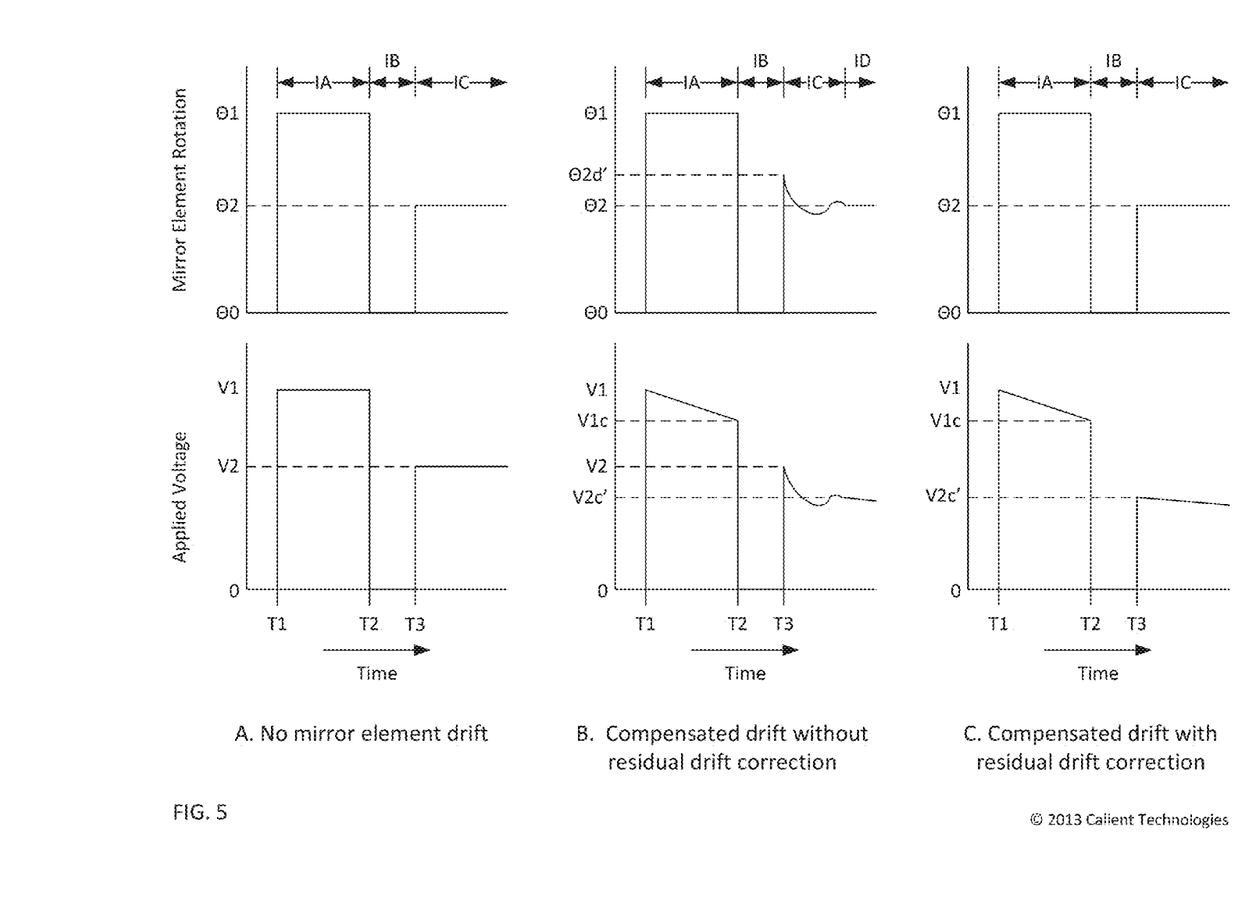
FIG. 5 shows graphs illustrating the operation of a hypothetical mirror element under three sets of assumptions.

FIG. 5 illustrates the performance of a hypothetical mirror element in an optical circuit switch using the same three sets of assumptions used in FIG. 4. In each case, the lower chart plots the voltage applied to a mirror electrode versus time, and the upper chart plots the mirror rotation angle on the same time scale. The left pair of charts (A) shows the mirror element performance under the assumption that mirror element drift does not occur. At time T1, a first baseline voltage V1 is applied to the electrode to cause the mirror to rotate to a desired angle $\Theta 1$. Since there is assumed to be no mirror element drift, both the voltage V1 and the angle $\Theta 1$ are stable during the following time interval IA. At time T2, the applied voltage is changed to 0 volts, and the mirror element returns to a default rotation angle $\Theta 0$. At time T3 a second baseline voltage V2 is applied to the electrode, causing the mirror element to rotate to a new desired angle $\Theta 2$. The applied voltage and the mirror element rotation angle are both stable during the following time interval IC.

The center pair of charts (B) shows the mirror element performance under the assumptions that (1) mirror element drift occurs and is compensated by the position optimizer 354 and (2) residual drift is not considered when making a new connection. At time T1, the first baseline voltage V1 is applied to the electrode to cause the mirror to rotate to the desired angle $\Theta 1$. Mirror element drift occurs, but is compensated as the position optimizer 330 gradually reduces the applied voltage to a value V1c (V1compensated) to keep the mirror element rotation angle fixed over the time interval IA. At time T2, the applied voltage is changed to 0 volts, and the mirror element returns to a default rotation angle $\Theta 0$ or to some other angle dictated by the trapped charge, mechanical stress, and other factors contributing to mirror element drift. During the subsequent time interval IB, the trapped charge, mechanical stress, and other factors contributing to mirror element drift may decay to some extent. At time T3 the second baseline voltage V2 is applied to the electrode, causing the mirror element to rotate to an angle $\Theta 2d'$, which may be different from the desired rotation angle $\Theta 2$. The angle $\Theta 2d'$ may also be different from the angle $\Theta 2d$ of FIG. 4. The difference between the actual rotation angle $\Theta 2d'$ and the desired rotation angle $\Theta 2$ may be determined by the amount of drift that occurred during the time interval IA and the degree to which the drift decayed during time interval IB. The difference between the actual rotation angle $\Theta 2d'$ and the desired rotation angle $\Theta 2$ may be sufficient to degrade or break the intended connection. During time interval IC, the position optimizer may undertake a search to determine the compensated voltage V2c' to cause the mirror element to rotate to the desired angle. During this search, the applied voltage and the mirror rotation angle may vary and the connection may be unreliable or intermittent.

The right pair of charts (C) shows the mirror element performance under the assumptions that (1) mirror element drift occurs and is compensated by the position optimizer 330 and (2) any change in the voltage applied to the mirror element is corrected using an estimate of residual drift. At time T1, the first baseline voltage V1 is applied to the electrode to cause the mirror to rotate to the desired angle Θ1. Mirror element drift occurs, but is compensated as the position optimizer 330 gradually reduces the applied voltage to a value V1c (V1compensated) to keep the mirror element rotation angle fixed over the time period IA. At time T2, the applied voltage is change to 0 volts. During the subsequent time interval IB, the trapped charge, mechanical stress, and other factors contributing to mirror element drift may decay to some extent. At time T3, a command is received to make a different connection requiring the mirror element to rotate to the second angle Θ2. The mirror calibration table 316 may be consulted to determine the second baseline voltage V2 that would cause the mirror to rotate to the desired angle Θ2 in the absence of drift. Recognizing that residual drift accumulated over the time interval IA and relaxed over time interval IB, a corrected voltage V2c' may be estimated. The corrected voltage V2c' may be estimated by applying a correction factor to the baseline voltage. The correction factor may be derived, for example, from the difference between the first voltage V1 and the compensated voltage V1c and the length of the time interval IB. The corrected voltage V2c' may be applied to the electrode at time T2, causing the mirror to rotate to an angle very close to the desired angle Θ2. After the desired angle Θ2 is achieved, additional drift compensation may continue to lower the voltage over time period IA to compensate for continued drift.

Figure 6:
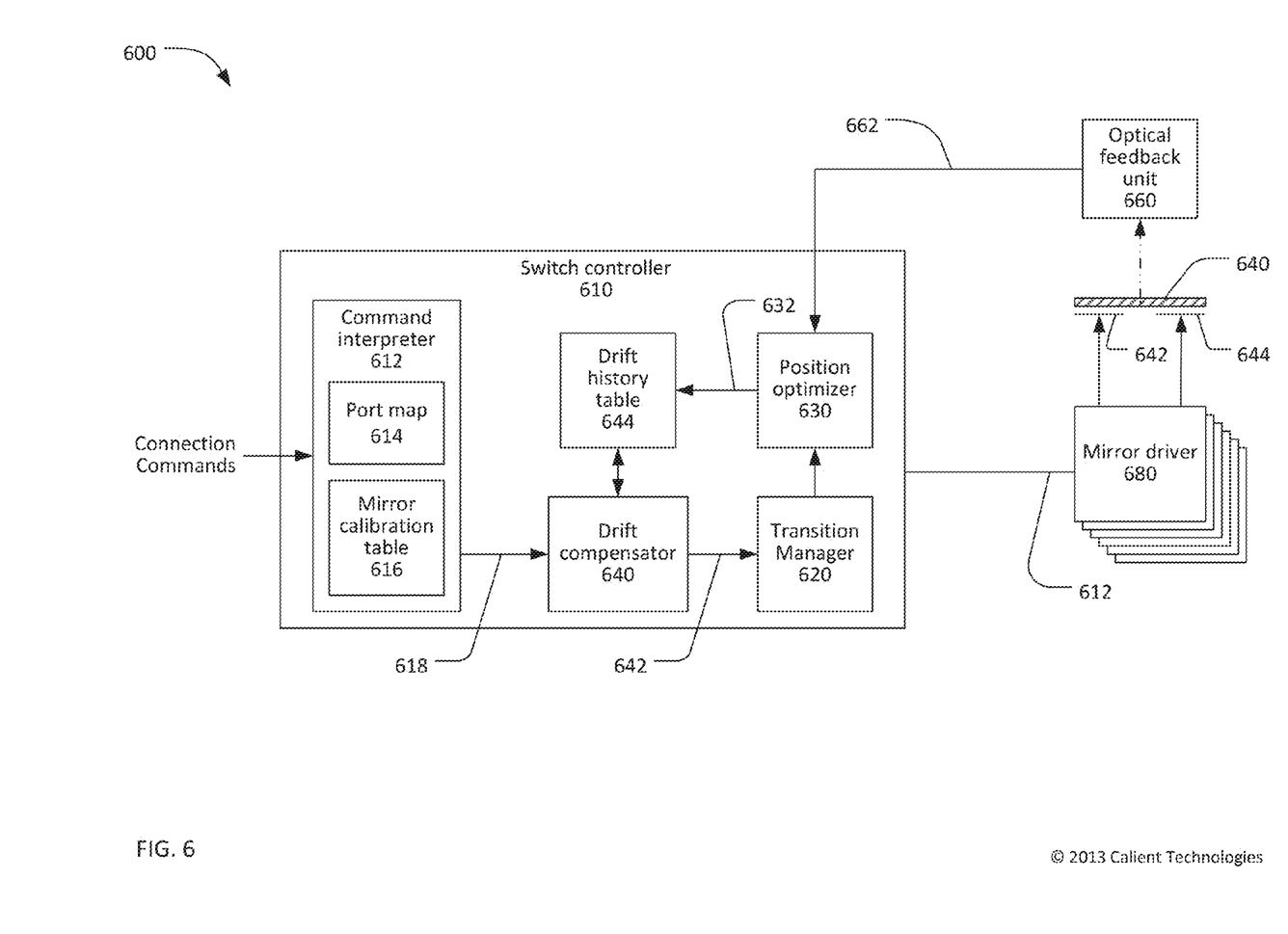
FIG. 6 is a block diagram of another optical circuit switch.

Referring now to FIG. 6, an optical circuit switch 600, which may be the optical circuit switch 100, may include a switch controller 610, an optical feedback unit 660, a plurality of mirror elements (of which only mirror element 640 is shown) in one or more mirror arrays, and a plurality of mirror driver circuits 680. The optical feedback unit 660, the plurality of mirror elements, and the plurality of mirror driver circuits 680 may function as described with respect to the counterpart elements of the optical circuit switch 300 of FIG. 3. Descriptions of these elements will not be repeated.

The controller 610 may include a command interpreter 612, a transition manager 620, and a position optimizer 630 which may function as described with respect to the counterpart elements of the controller 310 of FIG. 3. Descriptions of these elements will not be repeated. The controller 610 may also include a drift compensator 640 and a drift history table 644 which is maintained by the position optimizer 630 and the drift compensator 640.

When a connection is made, the drift compensator 640 may receive baseline voltages 618 from the command interpreter 612. The drift compensator 640 may adjust the baseline voltages to account for accumulated drift, as documented in the drift history table 644, to provide compensated voltages 642 to the transition manager.

Each mirror element may be considered to be in one of an accumulation mode (A mode), a decay mode (D mode), or a relaxed mode (R mode). Mirror elements used in an active connections through the optical circuit switch are in the A mode. Voltages may be applied to one or more electrodes associated with each A mode mirror element. Trapped charge, mechanical stress, and other factors contributing to mirror element drift may be accumulating. The position optimizer 630 may compensate for drift of each A mode mirror element by periodically optimizing the position of each mirror element based on feedback from the optical feedback unit 660. The position optimizer 630 may also periodically store data indicative of the amount of mirror element drift in the drift history table 644. For example, for each mirror element in the A mode, the data stored in the drift history table 644 may include the following:

a flag indicating the mirror element is in the A mode;
   the present time (the time when the drift history table was last updated);
   the present voltage applied to each electrode associated with the mirror element (in order to maintain a minimum insertion loss connection);
   the baseline voltage for each electrode associated with the mirror element to make the connection; and
   an estimate of the angular drift of the mirror element. The estimate of the angular drift may be based on the differences between the baseline voltages for the electrodes and the present voltages. For mirror elements that rotate about two orthogonal axes, independent estimates of the angular drift on each axis may be stored.

Mirror elements that are currently unused but recently involved in a connection through the optical circuit switch are considered to be in the D mode. Zero volts (or some other at-rest voltage value) may be applied to the electrodes associated with mirror elements in the D mode. Previously accumulated trapped charge, mechanical stress, and other factors that contribute to mirror element drift may be slowly decaying. The data stored in the drift history table 644 for each D mode mirror element may include the following:

a flag indicating the mirror element is in the D mode;
   the baseline voltage for each electrode associated with the mirror element to make the connection;
   the time the connection was last broken;
   the final voltage for each electrode associated with the mirror element at the time the connection was last broken;
   the present time (the time the angular drift of the mirror element was last estimated;
   an estimate of the residual angular drift of the mirror element. The estimate of the present angular drift may be based on the differences between the baseline voltages for the electrodes and the final voltages and the time interval between the present time and the time the connection was broken.

The drift compensator 640 may estimate the residual angular drift of mirror element in the D mode by multiplying an estimate of the angular drift at the time the connection was broken by, for example, a decaying exponential function having a predetermined time constant. The drift compensator 640 may estimate the residual angular drift by multiplying an estimate of the angular drift at the time the connection was broken by a sum of two or more decaying exponential functions having different time constants representing different sources of mirror element drift. For mirror elements that rotate on two orthogonal axes, mirror element drift on the two axes may be decayed using the same or different time constants. The predetermined time constant or time constants may be the same or different for all mirror elements. When different time constants are used, specific time constants for each mirror element may be stored, for example, in the mirror calibration table 616. The drift compensator 640 may estimate the residual angular drift of mirror elements in the D mode using a mathematical expression other than an exponential function or in some other manner.

Mirror elements that do not have any residual angular drift are in the R mode. Mirrors elements in the R mode include mirror elements that have never been used in connections through the optical circuit switch and thus never accumulated any angular drift. Mirrors elements that were previously used in a connection and remained in the D mode for a sufficient period of time for their residual drift to reach a negligible value may also be considered to be in the R mode. For example, a change of state from the D mode to the R mode may occur by definition after passage of a predetermined time interval. The data stored in the drift history table 644 for each R mode mirror element may simply be a flag indicating that the mirror element is in the R mode.

Figure 7:
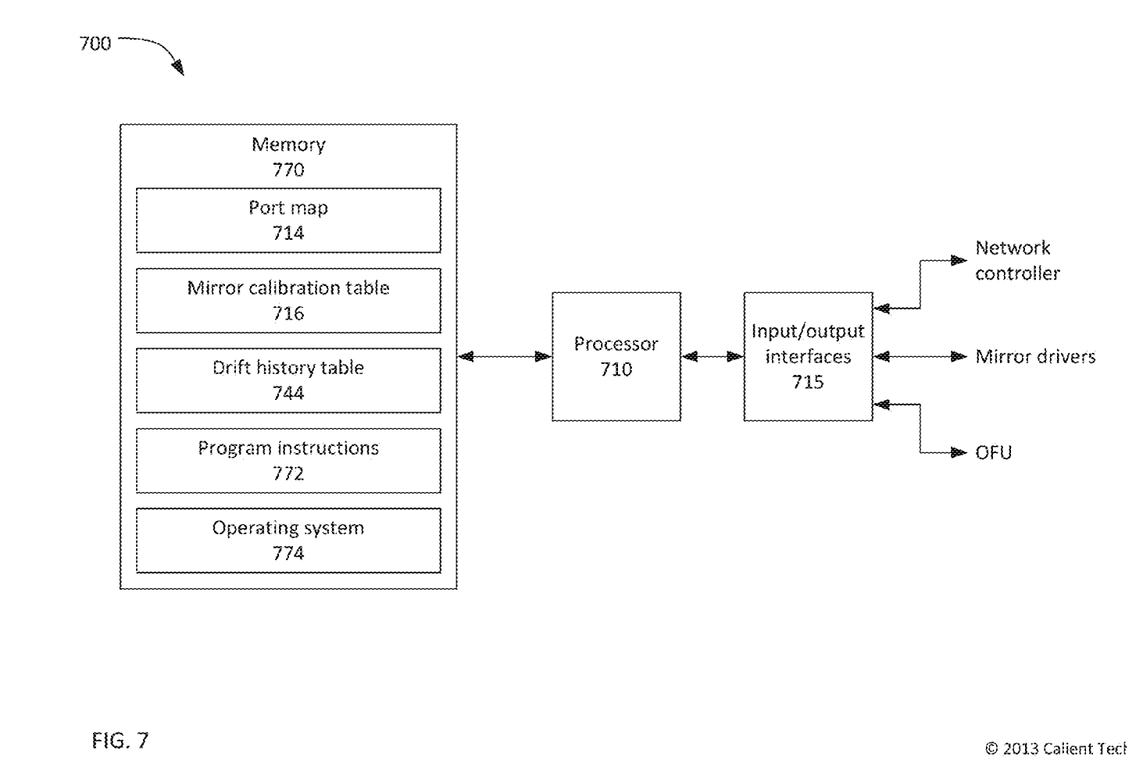
FIG. 7 is a block diagram of a computing device.

Referring now to FIG. 7, a controller 700, which may be suitable for use as the controller 610 in the optical circuit switch 600, may include a processor 710 coupled to a memory 770 and input/output interfaces 715. The controller 700 may implement the functions of the command interpreter 612, the drift compensator 640, the transition manager 620 and the position optimizer 630.

The processor 710 may include one or more processing devices, such as microprocessors and programmable signal processors, that execute software instructions stored in the memory 770. The processor 710 may include one or more non-programmable processing devices that execute hardware-defined functions. The processor 710 may include other specialized circuits and devices as required to implement the methods and functions described herein. When the processor 710 includes multiple processing devices, the processing devices may be separately coupled to the memory 770 and the input/output interfaces 715.

The memory 770 may include both nonvolatile memory and volatile memory. The nonvolatile memory may be or include semiconductor read-only memory, semiconductor nonvolatile memory such as flash memory, magnetic storage devices such as magnetic disc drives, and optical storage devices such as CD-ROM or CD-R/W drives. The volatile memory may be static or dynamic semiconductor random access memory (RAM).

The memory 770 may store software instructions for execution by the processor 710. The software instructions may include program instructions 772 and an operating system 774. The program instructions 772 may include instructions to cause the processor 710 to implement all or part of the functions of the command interpreter 612, the drift compensator 640, the transition manager 620 and the position optimizer 630. The operating system 774 may be an embedded or real time operating system such as, for example, a version of Windows Embedded® or Linux®, or some other operating system.

The memory 770 may store tables, lists, and other data for use by the processor 710. The data stored in the memory 770 may include a port map 714 that identifies which mirror on one of two mirror arrays is associated with each port of the optical circuit switch. The data stored in the memory 770 may include a mirror calibration table 716 which contains data describing the performance of each movable mirror in the optical circuit switch. The data stored in the memory 770 may include a drift history table 744 listing an operational history of each mirror element and associated information.

The input/output interfaces 715 may include circuits, devices, and/or firmware to transfer data between the processor 710 and one or more optical monitoring modules (OMMs), a large plurality of mirror drivers, and a connection to a network controller such as the network controller 210.

Description of Processes

Figure 8:
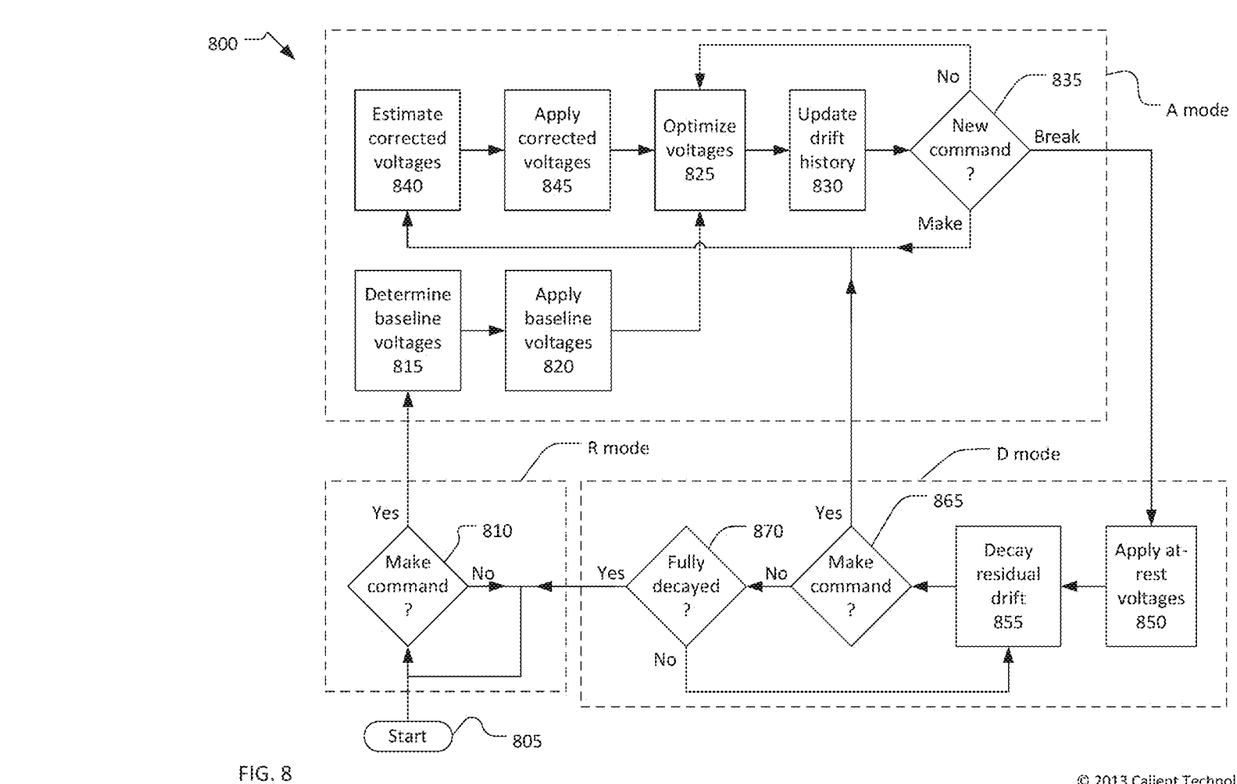
FIG. 8 is a flow chart of a process for operating an optical circuit switch.

Referring now to FIG. 8, a process 800 to control a mirror element within an optical circuit switch may start at 805 when the optical circuit switch is first placed into service. The process 800 may continue perpetually so long as the optical circuit switch is in service. The process 800 controls a single mirror element, and multiple instantiations of the process 800 may run concurrently to control a corresponding number of mirror elements. The process 800 is cyclic in nature and all or portions of the process 800 may be repeated numerous times during the operation of an optical circuit switch to make a corresponding number of connections. The process 800 may be executed by a controller, such as the controller 610 or the controller 700.

The process 800 controls a single mirror element which may be associated with either a specific input port or a specific output port. When the process 800 starts at 805, the mirror element may be, by definition, in a relaxed mode or R mode. At 810, a determination may be made whether or not a Make command affecting the mirror element has been received by the optical circuit switch. A Make command may be received from, for example, a network controller such as the network controller 210. A Make command affects the mirror element controlled by the process 800 if the Make command defines a connection to or from the input or output port associated with the mirror element. When a Make command affecting the mirror element has not been received, the process 800 may idle at 810 until a Make command is received.

When a determination is made at 810 that a Make command affecting the mirror element has been received, the mirror element may be considered to be in an accumulate mode (A mode). Baseline voltages to be applied to electrodes coupled to the mirror element may be determined at 815. The baseline voltages may be determined, for example, by consulting the mirror calibration table 316 or 616. The baseline voltages may be applied to the electrodes associated with the mirror element at 820.

At 825, the voltages applied to the electrodes may be optimized, which is to say the voltages applied to the electrodes may be adjusted to minimize the insertion loss of the corresponding connection through the optical circuit switch. A position optimizer, such as the position optimizer 330 or 630 may adjust the voltages in response to feedback from an optical feedback unit such as the optical feedback unit 360 or 660.

At 830, a drift history table, such as the drift history table 644, may be updated to reflect the fact that the mirror element is used in a connection through the optical circuit switch and to document the time of the connection and the voltages applied to the electrodes.

At 835, a determination may be made if a new command affecting the mirror element has been received. When a new command has not been received ("no" at 835), the process 800 may periodically re-optimize the voltages applied to the electrodes at 825 and update the information in the drift history table at 830 until a command is received. In this context, "periodically" means at regular intervals. Each cycle through the actions 825-835 may occur at regular intervals and may be initiated, for example by an interrupt or input from a hardware or software timer (not shown).

While the mirror element is used in a first connection through the optical circuit switch, a Make command may be received that requires the mirror element to be redeployed in a second connection through the optical circuit switch. The second connection will require a different rotation angle (on at least one axis) for the mirror element and corresponding different voltages. However, since the mirror element was previously used in a connection through the optical switch, the mirror element may have residual angular drift. When a determination is made at 835 that a Make command affecting the mirror element has been received, the process 800 may proceed to 840 to estimate corrected voltages required to make the second connection in the presence of the residual angular drift.

Figure 9:
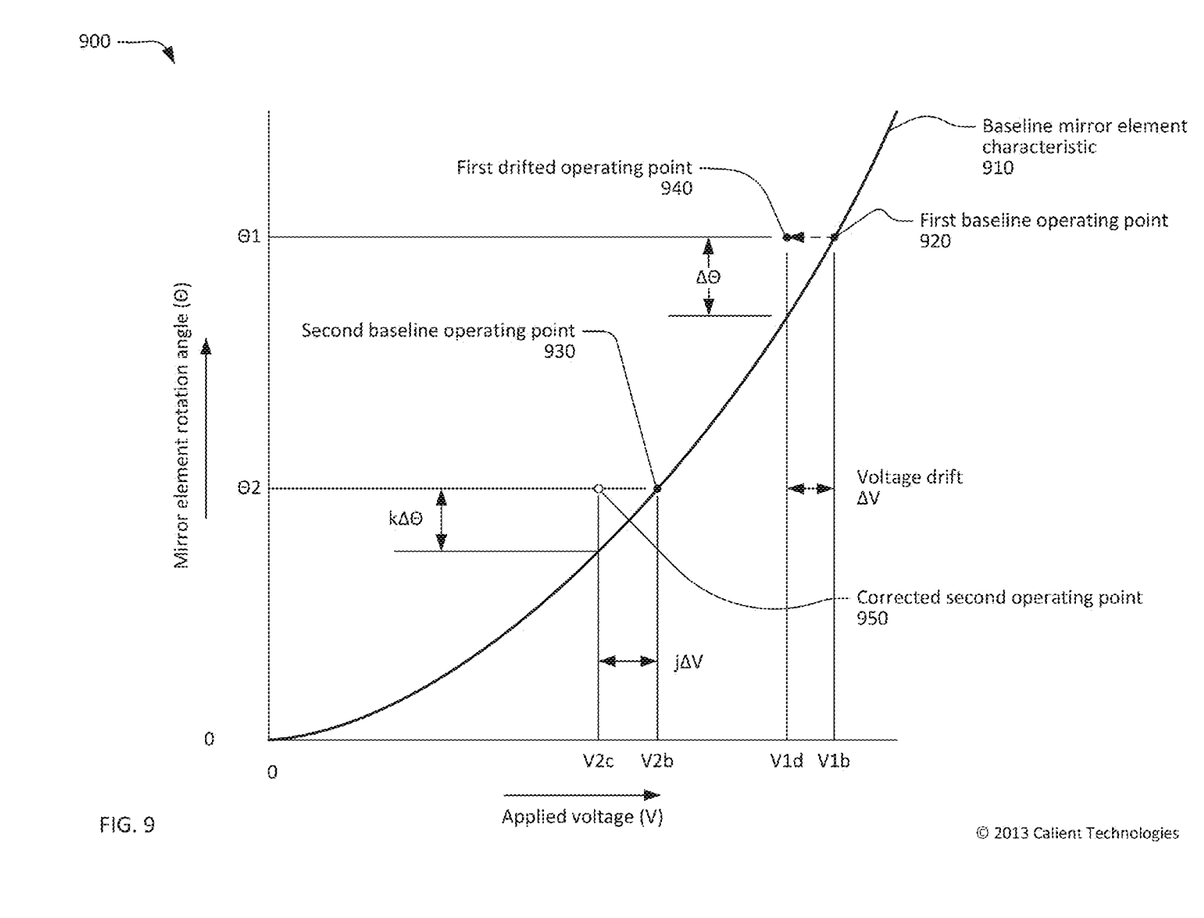
FIG. 9 is a graph illustrating mirror element drift.

Techniques to estimate voltages that correct mirror element angular drift may be understood with reference to FIG. 9. FIG. 9 is an exemplary graph of the rotation angle of a mirror element versus the voltage applied to an electrode coupled to the mirror element. The mirror element rotation angle $\Theta$ depends on the voltage V applied to the electrode. In the absence of mirror element drift, the relationship between the mirror element rotation angle $\Theta$ and the voltage V may be expressed by the formulas:

$$\Theta = Fb(V) \tag{1}$$

$$V = Fb^{-1}(\Theta) \tag{2}$$

where Fb represents a baseline function and $Fb^{-1}$ represents the inverse function. An exact mathematical expression for the function Fb may not be known. Further, the function Fb may be different for each mirror element. In cases where a mirror element can be rotated about two orthogonal axes, the function Fb may be different for each axis. In cases where a mirror element may be rotated in both clockwise and counter clockwise directions in response to voltages applied to two different electrodes (as shown in the detail 105 in FIG. 1), the function Fb may be different for each direction of rotation. The function Fb and/or $Fb^{-1}$ may be determined empirically from measurements performed on mirror elements during manufacture of the optical circuit switch. The function Fb and/or $Fb^{-1}$ may be defined in tabular form (for each mirror element, axis, and direction of rotation as appropriate) in the mirror calibration table 316/616.

For simplicity, FIG. 9 assumes that the baseline relationship between the mirror element rotation angle $\Theta$ and the voltage V is defined by the formula:

$$\Theta = bV^2 \tag{3}$$

where b=a proportionality constant.

The bold curve 910 is the baseline mirror element characteristic as given by equation (3). A first solid dot indicates a first baseline operating point 920 where a first baseline voltage $V1b$ applied to the electrode causes the mirror element to rotate to a first angle $\Theta 1$ to form a first connection through an optical circuit switch. A second solid dot indicates a second baseline operating point 930 on the curve 910 where a second baseline voltage $V2b$ applied to the electrode causes the mirror element to rotate to a second angle $\Theta 2$ to form a second connection through the optical circuit switch.

A third solid dot represents a first drifted operating point 940 of the mirror element at some time after the first connection was made. The rotation angle of the mirror element is still $\Theta 1$ (to maintain the first connection through the optical circuit switch), but the position optimizer 330/630 has adjusted the applied voltage to a value $V1d$ to compensate for the accumulated mirror element drift. For ease of visualization, the amount of voltage drift has been greatly exaggerated compared to mirror elements in actual optical circuit switches.

Given the function Fb and/or $Fb^{-1}$ (as mathematical expressions or in tabular form), the voltage drift $\Delta V$ (i.e. the difference between $V1b$ and $V1d$) can be converted to an equivalent angular drift $\Delta\Theta$ using the formula:

$$\Delta\Theta = Fb(V1b) - Fb(V1d) \tag{4}$$

Accumulated drift data, such as the equivalent angular drift $\Delta\Theta$, the drifted voltage $V1d$, and/or the voltage drift $\Delta V$ may be periodically stored in the drift history table 644. For example, the accumulated drift data may be stored in the drift history table 644 each time the position optimizer 630 re-optimizes the insertion loss of the first connection through the optical circuit switch.

It is important to recognize that the third solid dot, which represents the first drifted operating point 940, does not lie on the curve 910. This indicates that, in the presence of accumulated mirror element drift, the relationship between applied voltage and mirror element rotation is defined by an unknown function Fd different from the function Fb. Further, the unknown function Fd presumably will not pass through the second baseline operating point 930, but may pass though a corrected second operating point 950. Thus a corrected voltage $V2c$ must be applied to the electrode (instead of the baseline voltage $V2b$) to cause the mirror element to rotate to the angle $\Theta 2$ to make the second connection through the optical circuit switch.

The corrected voltage $V2c$ may be estimated based on the known characteristics of the mirror element (e.g. the function $Fb^{-1}$) and the values for $\Delta\Theta$ and/or $\Delta V$. For example, $V2c$ may be estimated using the presumption that the ratio of the drifted voltage to the baseline voltage is constant for all rotation angles:

$$V2c = (V1d/V1b)V2b$$

$$= (V1d/V1b)Fb^{-1}(\Theta 2) \tag{5}$$

$V2c$ may be estimated based on the voltage drift $\Delta V$, as follows:

$$V2c = V2b + k\Delta V$$

$$= Fb^{-1}(\Theta 2) + k\Delta V \tag{6}$$

where k=a predetermined constant.

$V2c$ may be estimated based on the equivalent angular error $\Delta\Theta$, as follows:

$$V2c = Fb^{-1}(\Theta 2 + j\Delta\Theta) \tag{7}$$

where j=another predetermined constant.

$V2c$ may be estimated based on the both the voltage drift $\Delta V$ and the equivalent angular error $\Delta\Theta$, as follows:

$$V2c = Fb^{-1}(\Theta 2 + j\Delta\Theta) + k\Delta V \tag{8}$$

Some other formula, algorithm or technique may be used to estimate the corrected voltage $V2c$ based on the characteristics of the mirror element and the values for $\Delta\Theta$ and/or $\Delta V$.

Where used, the constants j and/or k may be different for each mirror element. In cases where a mirror element can be rotated about two orthogonal axes, the constants j and k may be different for each axis. In cases where a mirror element may be rotated in both clockwise and counterclockwise directions in response to voltages applied to two different electrodes (as shown in the detail 105 in FIG. 1), the constants j and k may be different for each direction of rotation. Different values of the constant j and k may be used when a mirror element is to be rotated in a direction opposite to the direction where drift was accumulated. The constants j and k may be determined empirically from measurements performed on mirror elements during manufacture of the optical circuit switch.

Referring back to FIG. 8, corrected voltages may be estimated at 845 as previously described. The corrected voltages may be applied to the electrodes associated with the mirror element at 845, and the voltages may be optimized at 825 as previously described. The process 800 may then periodically cycle through the actions at 825-835 until a new command is received.

When a determination is made at 835 that a Break command affecting the mirror element has been received, the mirror element may be considered to be in a decay mode (D mode). At 850, at-rest voltages, which may typically be zero volts, may be applied to the electrodes associated with the mirror element. The process 800 may then cycle through the actions at 855-870 periodically until either a new break command is received (yes at 865) or until the residual drift values stored in the drift history table have been fully decayed (yes at 870).

The estimated residual drift may be periodically decayed (i.e. incrementally reduced) at 855. To decay the residual drift, the present values for ΔΘ and/or ΔV may be read from the drift history table. The values for ΔΘ and/or ΔV may be incrementally reduced, and the decayed values may be stored back in the drift history table. The values for ΔΘ and/or ΔV may be decayed linearly. For example, the values for ΔΘ and/or ΔV may be reduced periodically by a predetermined fixed amount. The values for ΔΘ and/or ΔV may be reduced periodically by a predetermined fraction of their original values, which is to say their values at the time of the break command (at 835) that caused the process 800 to enter the D mode. The values for ΔΘ and/or ΔV may be decayed exponentially. For example, the values for ΔΘ and/or ΔV may be periodically multiplied by a predetermined decay factor that is less than 1.0. The values for ΔΘ and/or ΔV may be decayed by multiplying the values by a series of fractional numbers read from a table in memory. The values for ΔΘ and/or ΔV may be decayed in some other manner.

At 865, a determination may be made if a Make command affecting the mirror element has been received. When a Make command has been received (yes at 865) the process 800 may return to 840, where corrected voltages for the new connection may be estimated based on the most recent decayed residual drift values stored in the drift history table.

When a determination is made at 865 that a Make command affecting the mirror element has not been received, a further determination may be made at 870 if the residual values have been fully decayed. In the case where the residual drift values are decayed linearly, the residual drift values may be considered to be "fully decayed" when the values have been reduced to zero. In the case where the residual drift values are decayed exponentially, the residual drift values may never actually reach zero. In this case, the residual drift values may be consider to be fully decayed when the remaining values are less than predetermined threshold values, or when the residual drift values have be decayed for a predetermined time period. The residual drift values may be determined to be fully decayed in some other manner.

When a determination is made at 870 that the residual drift values have been fully decayed, the process 800 may return to 810 to await the next Make commands affecting the mirror element.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for making a connection in an optical circuit switch, comprising:

receiving a first make command to make a first optical connection between a first port and a second port, the first port uniquely associated with a rotatable mirror element;

determining a first baseline voltage to be applied to an electrode coupled to the minor element to cause the minor element to rotate about an axis to make the first optical connection;

applying the first baseline voltage to the electrode;

periodically adjusting the voltage applied to the electrode to minimize an insertion loss of the first optical connection;

periodically storing accumulated drift data in a memory, the accumulated drift data derived from a difference between the adjusted voltage applied to the first electrode and the first baseline voltage;

receiving a break command to break the first optical connection;

applying an at-rest voltage to the first electrode; and decaying the accumulated drift data in accordance with a predetermined decay function.

2. The method of claim 1, further comprising:

receiving a second make command to make a second optical connection between the first port and a third port different from the second port;

determining a second baseline voltage to be applied to the electrode, in the absence of accumulated angular drift, to cause the minor element to rotate about the axis to make the second optical connection;

determining a corrected voltage based on the second baseline voltage and the accumulated drift data; and applying the corrected voltage to the first electrode.

3. The method of claim 1, further comprising:

receiving a second make command to make a second optical connection between the first port and a third port different from the second port;

determining a second baseline voltage to be applied to the first electrode, in the absence of accumulated mirror element drift, to cause the mirror element to rotate about the first axis to make the second optical connection;

determining a corrected voltage based on the second baseline voltage and the accumulated drift data; and applying the corrected voltage to the electrode.

4. The method of claim 1, wherein decaying the accumulated angular drift data in accordance with a predetermined decay function comprises periodically reducing the accumulated drift data in accordance with the decay function.

5. The method of claim 4, wherein the decay function is linear.

6. The method of claim 4, wherein the decay function is exponential.

7. The method of claim 5, wherein the decay function is stored in a lookup table.

8. The method of claim 1, wherein the accumulated drift data comprises the difference between the adjusted voltage applied to the first electrode and the first baseline voltage.

9. The method of claim 1, wherein the accumulated drift data comprises an equivalent angular error.

10. An optical circuit switch, comprising:
a first port uniquely associated with a rotatable mirror element;
a second port;
a controller configured to:
receive a first make command to make a first optical connection between a first port and a second port, the first port uniquely associated with a rotatable mirror element;
determine a first baseline voltage to be applied to an electrode coupled to the mirror element to cause the mirror element to rotate about an axis to make the first optical connection;
apply the first baseline voltage to the electrode;
periodically adjust the voltage applied to the electrode to minimize an insertion loss of the first optical connection;
periodically store accumulated drift data in a memory, the accumulated drift data derived from a difference between the adjusted voltage applied to the first electrode and the first baseline voltage;
receive a break command to break the first optical connection;
apply an at-rest voltage to the first electrode; and
decay the accumulated drift data in accordance with a predetermined decay function.

11. The optical circuit switch of claim 10, the controller further configured to:
receive a second make command to make a second optical connection between the first port and a third port different from the second port;
determine a second baseline voltage to be applied to the electrode, in the absence of accumulated mirror element drift, to cause the mirror element to rotate about the axis to make the second optical connection;
determine a corrected voltage based on the second baseline voltage and the accumulated drift data; and
apply the corrected voltage to the first electrode.

12. The optical circuit switch of claim 10, the controller further configured to:
receive a second make command to make a second optical connection between the first port and a third port different from the second port;
determine a second baseline voltage to be applied to the first electrode, in the absence of accumulated mirror element drift, to cause the mirror element to rotate about the first axis to make the second optical connection;
determine a corrected voltage based on the second baseline voltage and the accumulated drift data; and
apply the corrected voltage to the electrode.

13. The optical circuit switch of claim 10, wherein, to decay the accumulated drift data in accordance with a predetermined decay function, the controller is further configured to periodically reduce the accumulated drift data in accordance with the decay function.

14. The optical circuit switch of claim 13, wherein the decay function is linear.

15. The optical circuit switch of claim 13, wherein the decay function is exponential.

16. The optical circuit switch of claim 13, wherein the decay function is stored in a lookup table.

17. The optical circuit switch of claim 10, wherein the accumulated drift data comprises the difference between the adjusted voltage applied to the first electrode and the first baseline voltage.

18. The optical circuit switch of claim 10, wherein the accumulated drift data comprises an equivalent angular error.

* * * * *

UNITED STATES PATENT AND TRADEMARK OFFICE
CERTIFICATE OF CORRECTION

PATENT NO. : 8,712,239 B1
APPLICATION NO. : 14/040437
DATED : April 29, 2014
INVENTOR(S) : Miglani et al.

Page 1 of 1

It is certified that error appears in the above-identified patent and that said Letters Patent is hereby corrected as shown below:

In he Claims:

Column 16 line 32: replace "minor" with --mirror--

Column 16 line 33: replace "minor" with --mirror--

Column 16 line 54: replace "minor" with --mirror--

Signed and Sealed this
Fifteenth Day of July, 2014

Michelle K. Lee
*Deputy Director of the United States Patent and Trademark Office*